(12) United States Patent
Gutowski (10) Patent No.: US 7,313,391 B2
(45) Date of Patent: Dec. 25, 2007

(54) MODELING OF RF POINT SOURCE REFERENCE FOR ANALYSIS OF WIRELESS SIGNAL PROPAGATION

(75) Inventor: Stanley J. Gutowski, Arlington, VA (US)

(73) Assignee: Andrew Corporation, Westchester, IL (US)

( * ) Notice: Subject to any disclaimer, the term of this patent is extended or adjusted under 35 U.S.C. 154(b) by 1009 days.

(21) Appl. No.: 09/951,503

(22) Filed: Sep. 14, 2001

(65) Prior Publication Data

US 2002/0063656 A1     May 30, 2002

Related U.S. Application Data

(60) Provisional application No. 60/235,435, filed on Sep. 26, 2000.

(51) Int. Cl.
*H04Q 5/20*     (2006.01)
(52) U.S. Cl. ............... 455/423; 455/69; 455/277.1; 455/456.5; 375/130; 342/360
(58) Field of Classification Search ............ 455/9, 455/10, 13.4, 39, 67.13, 67.14, 68, 69, 107, 455/114.2, 114.3, 115.1–115.3, 127.1, 127.2, 455/450, 452.1, 452.2, 455, 456.1, 456.2, 455/517, 522, 277.1, 423, 448, 456.5; 342/360, 342/458; 375/130, 352
See application file for complete search history.

(56) References Cited

U.S. PATENT DOCUMENTS

| | | | | |
|---|---|---|---|---|
| 4,549,311 | A * | 10/1985 | McLaughlin | 455/277.1 |
| 5,887,245 | A * | 3/1999 | Lindroth et al. | 455/69 |
| 6,384,780 | B2 * | 5/2002 | Walley et al. | 342/360 |
| 6,580,394 | B2 * | 6/2003 | Wang et al. | 342/458 |
| 6,587,690 | B1 * | 7/2003 | Di Huo et al. | 455/446 |
| 2001/0022779 | A1 * | 9/2001 | Wheatley et al. | 370/252 |
| 2002/0058503 | A1 * | 5/2002 | Gutowski | 455/423 |
| 2002/0063656 | A1 * | 5/2002 | Gutowski | 342/360 |
| 2002/0196840 | A1 * | 12/2002 | Anderson et al. | 375/130 |

\* cited by examiner

*Primary Examiner*—Gerald Gauthier
(74) *Attorney, Agent, or Firm*—Duane Morris LLP (57) ABSTRACT

A data collection and evaluation method for determination of wireless signal propagation from an incomplete set of measured data and for modeling the system as a set of RF point sources located at the tower in each cell. RF propagation measurements are collected according to the present invention, by moving through the wireless system while collecting signal strength data at a large number of locations throughout the wireless system. Signals are received from multiple antennae at each collection location. The present invention develops a non-directional RF propagation model based upon the signals received from each antenna at a particular cell site, the antenna directionality due to the design of the antenna and the orientation of the collection location and the cellular site. The digital identification information on the channel is decoded and used to associate the measurement with an individual originating wireless antenna and/or sector. The decoding process is limited by interference and low signal levels, therefore, the resulting data will have locations or entire areas where digital identification codes cannot be determined and the signal origination antenna cannot be identified. The RF propagation data is then analyzed to remove directionality of the individual antennae and to determine the absolute value of the path loss between the tower as an RF point source and a specific geographic location.

53 Claims, 6 Drawing Sheets

E plane    H plane

E and H plane antenna patterns.

MODELING OF RF POINT SOURCE REFERENCE FOR ANALYSIS OF WIRELESS SIGNAL PROPAGATION

RELATED APPLICATIONS

This application claims the benefit of Provisional Application No. 60/235,435 filed Sep. 26, 2000.

BACKGROUND OF THE INVENTION

The present invention relates to cellular telephone systems and to determination of the RF signal propagation for optimization of the wireless system. More specifically, the present invention relates to detailed RF propagation modeling based upon measured RF propagation data.

The service area of a wireless communications system is partitioned into connected service domains known as cells, where radio telephone (cellular) users communicate, via radio links, with the base station serving the cell. The cells can be further partitioned into segments, typically three to a cell. The cell includes an antenna mast. Typically, if the cell has three sectors, the mast will have three sides, each facing a 120° segment of the perimeter of the mast. Typically, a number of directional antennae are mounted on each face of the mast to serve each segment of the cell site. The base station is coupled to the land line network.

Presently available commercial mobile communication systems typically include a plurality of fixed cells each of which transmits signals to and receives signals from mobile units within its communication area. In AMPS or FDMA systems, each base station is assigned a plurality of channels (each 30 KHz wide) within a frequency spectrum over which it can communicate with mobile units. A mobile unit within range of the base station communicates with the base station using these channels. Typically, the channels used by a base station are separated from one another in some manner (typically skipping 1, 7 or 21 intermediate channels) so that signals on any channel do not interfere with signals on another channel used by that base station. To accomplish this, an operator typically allots to a base station a group of channels each of which is widely separated from the next. The present invention will also operate with GSM and iDEN systems which do not rely on the same frequency divisions multiple access method.

In a common type of mobile system called Time Division Multiple Access (TDMA), which includes IS-54 and IS-136, GSM and iDEN each frequency channel is further time divided into additional channels within each frequency. Each base station sends and receives in bursts during some number of different intervals or time slots. These time intervals within frequency bands then effectively constitute the individual channels. In order to distinguish the channel divisions within a frequency and to distinguish channels of a common frequency between overlapping cells digital codes are used. For example, IS-136 utilizes Digital Verification Color Codes unique to a channel at a cell. GSM uses Base Station identification codes.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communications with the mobile unit are transferred (handed off) from one base station to another in an area where the coverage from the adjoining cells overlaps. Because of this overlapping coverage, the channels allotted to the individual cells are carefully selected so that adjoining cells do not transmit or receive on the same channels. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. The pattern of channel assignments continues similarly with the other cells adjoining the first group of cells.

When collecting data for analysis and optimization of a wireless system, the present invention utilizes measured path lost data as the foundation for analyzing cellular systems. Path lost is defined as the attenuation in a source antenna (sector) and a point on the terrain of the wireless system. The path lost is measured by subtracting the RSSI of a signal at a location on the terrain from a known transmitted signal level for the received signal: Path Loss [dB]=Ptx [dBm]−RSSI [dBm]

In order to obtain RSSI values at various locations, a vehicle equipped with an RSSI scanning receiver and GPS receiver is driven by a technician on a predetermined route through the wireless system. During the drive, data is collected from the RSSI scanning receiver coordinated with the GPS receiver and log on a computer in the vehicle. The long information includes (at a minimum) GPS position (latitude, longitude), RSSI value and receive channel information.

Once data has been collected, it is post processed. The post processing involves associating each measurement to sector in calculating the path loss. The association of includes matching channel (and color code) from measurements to a channel (and color code) used on a sector. The path loss calculation requires knowledge of least one reference channel used on a sector and its transmit power.

To analyze a cellular system, it is necessary to have path loss information each location for sectors that may serve and sectors that may interfere at a particular location. For example, if a system requires a S/I (signal to interference ratio) of 20 dB for interference free communication, the collection must obtain measurements for all sectors that appear 20 dB below the serving signal level. With this information, it is possible to automate optimization tasks, such as determining frequency assignments that provide a desired quality of service.

Other cellular analysis tools rely on propagation modeling techniques to estimate the path loss between sectors and the locations on the terrain. Due to the effects of terrain, foliage, and man-made obstructions, it is impossible to estimate path loss was sufficient confidence to properly optimize a wireless system.

Since channels are reused in a wireless system, the challenge in obtaining measured path lost data involves measuring a signal from a sector independent of the signals transmitted by other sectors using the same channel. The following describes the current methodology and a proposed methodology for collecting measured path lost data.

Overview of Cellular Technologies.

Figure 1:
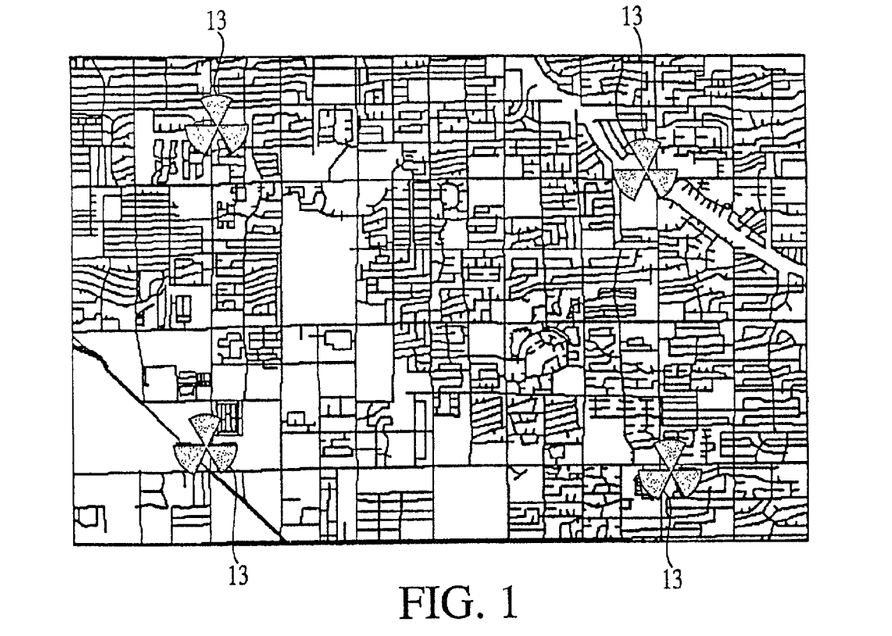
FIG. 1 is an exemplary map of a portion of a cellular telephone system.

IS 136 is a TDMA technology used extensively in North and South America. Each channel, as illustrated in FIG. 1, is 30 kHz and is comprised of six time slots per frame. The duration of a time slot is 6.67 milliseconds, producing a frame duration of 40 milliseconds. Most cellular operators use IS 136 in full duplex mode, such that each control/voice path requires to time slots per frame. Therefore each channel may serve up to three users.

Figure 2:
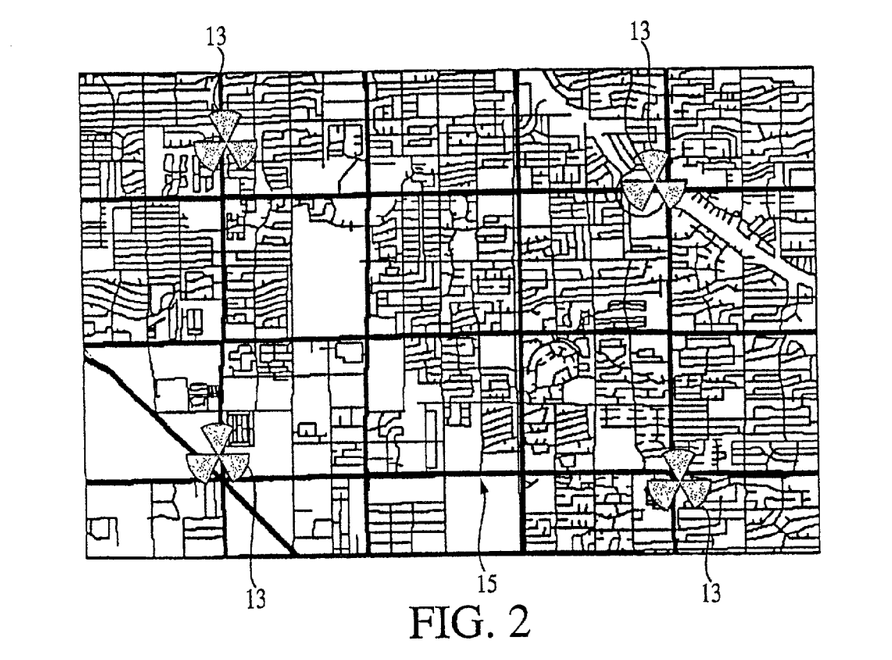
FIG. 2 is an exemplary drive test planning map projected on the cellular telephone system of FIG. 1.

On average, a typical sector, as illustrated in FIG. 2, contains six channels. One channel is designated as a control channel. The control information occupies two time slots per frame. The control channel transmits continuously at a constant power level. The remaining time slots provide two voice paths in the control channel.

In order to minimize interference in a wireless system, a voice channel becomes inactive when there are no time slots in use. Most systems employ a method for packing voice paths into channels that are in use in order to minimize the number of active channels in a system. Often, a priority is given to the control channel since it will always be in use and assigning voice paths into the control channel does not activate a new channel in the cellular system.

The Digital Verification Color Code DVCC room is transmitted on each time slot used for a voice path. The DVCC uses an 8 bit code with four parity bits, allowing 255 color code values (value 00 H. is not available for use close friends. Typically, each channel at a cells site uses the same DVCC assigned by the operator.

When a voice path is not used on a voice or control channel, the system assigns the DVCC value 255 to the on occupied time slots. Therefore, the channel/color code combination cannot be used as a unique identifier to determine the source sector for the signal. Unoccupied time slots from a number of cell sites and/or sectors will contain the same DVCC value.

In addition, the DVCC is not included in time slots used for the control path. Therefore the system must have voice traffic in order for the detectors to obtain the DVCC for a transmission. It is possible to obtain the DVCC from time slots used for the control path, but this would require decoding multiple control time slots.

The use of downlink power control becomes an issue for any measurements from voice channels. Power control dynamically adjusts the channel power level to maintain adequate level of service for the user while minimizing interference in the system. Since the transmit power fluctuates, it is not possible to use these channels for obtaining path lost measurements. In this situation, it is still possible to obtain measurements and color code from the voice time slots on the control channel.

iDEN is a proprietary cellular technology developed by Motorola. One of the obvious challenges in analyzing a iDEN signal is that the signal format specifications are not readily available. Each channel in and iDEN system occupies a bandwidth of 25 kHz. There are typically 426 base station radios and each sector. Unlike IS 136, radios in and iDEN system transmit constantly. Since the interference is constant, it is important to have a method for decoding the color code even in the presence of significant interference.

GSM, the standard sailor protocol deployed in Europe, is essentially the same as DCS 1800 and PCS 1900 (used in the United States). Many cellular operators are progressing toward a technology called EDGE that offers enhanced capabilities. EDGE is based in the same signal protocols has GSM.

The GSM channel is 200 kHz and utilizes 8 time slots. At least one channel on each base station contains time slots used for control information. Part of this control information includes the BSIC (base station identity code), which has 64 possible values. GSM channels used for voice traffic may only use power control and frequency hopping. Power control is used to minimize interference while frequency hopping tends to randomize the interference. This functionality is not allowed on the control channel.

IS95 (CDMA) unlike other cellular technologies that rely on frequency separation to minimize interference, uses the spread spectrum to combat interference. This allows the same channels to be used at every sector. IS95 uses multiple levels of encoding to reduce interference. The Welsh code is used within a channel on a sector to provide control information with voice paths. The pseudo-random noise (PN) code is used to identify each sector within a cellular system. There are 64 Walsh codes on each channel. The pilot channel uses Walsh code 0 and is transmitted continuously at a constant power level. Walsh codes used for voice paths use power control. The PN code is a sequence of 32,768 chips. Each sector transmits the same PN code at a different offset in time. The code is divided into 512 offset positions (PN offsets). A system will usually use a subset of these offsets, since signals propagate in a large distance may be delayed such that they appear as an adjacent offset.

Each base station is synchronized using a GPS timing reference. This allows transmission of the PN sequence at the proper offset position. By using this GPS timing reference to synchronize the receiver equipment to the system, it is possible to approximate propagation distance from a sector to the measurement location.

While traveling through a wireless system, a large number of signals from many different cells and sectors are received at each point throughout the system. The mobile units within the system receive signals from antennas directed towards the mobile units location, as well as from the back and/or side lobes of antennas directed away from the physical location of the mobile unit. The receipt of signals from antennas not directed towards the mobile unit is often referred to as back scatter or side scatter. Often adjacent or overlapping cells will transmit on the same frequency and both will be received by a mobile wireless unit. However, because of the digital codes identifying each channel, the mobile wireless unit can process the appropriate signal and ignore any additional reception.

It is desirable to provide a process for modeling a wireless system to determine the propagation of RF signals within the wireless system and for determining the effect on the system performance of proposed antenna changes, such as relocation, redirection, or substitution of antennas with different characteristics.

SUMMARY OF THE INVENTION

The present invention collects data at a large set of points within the wireless system from individual sectors and/or antennas at each cell site within a system to determine the actual RF propagation from each sector and/or antenna at the cell site. The present invention teaches analysis of the data obtained to model each antenna as an RF point source assuming a continuous omni-directional antenna. By combining signals received from the antenna directed towards the point with signals received as back scatter and/or side scatter from the antennas directed away from the collection point, the present invention can determine the absolute RF signal path loss to the collection point by factoring out influences triple to antenna design, directionality and orientation.

Performance, in terms of service evaluation quality, is the goal of the collection and analysis taught herein. The present invention teaches drive testing to measure and collect RF propagation within a wireless system. Performance quality is determined by the analysis of the measured test drive data.

Drive testing is used to aid in evaluation of the system, to determine cell placement and channel distribution and to evaluate sector interference. A cellular service area is analyzed and a drive route is established. Determination of a proper and effective drive route is essential for proper system evaluation. The drive route is based on a complex analysis of the system, including its electronic and geographic features. Once a drive route is established, one or more vehicles are driven through the cellular system to collect data. The vehicles are provided with radio receivers for detecting the signal strength from the cell sites and with positioning equipment such as GPS receivers to determine the location corresponding to a received signal. The vehicle are also equipped with data collection equipment, such as computers for collection and correlation of the data.

The measurement system is typically installed in a vehicle. Data is collected as the vehicle travels a predetermined route within the service area. The measurement system can also be used to collect data within a building, although this requires a different mechanism for providing the positioning information. The typical measurement system consists of a scanning receiver, GPS, and laptop computer. The scanning receiver produces signal level measurements for a predetermined list of channels while the GPS provides positioning (latitude/longitude) information. The laptop computer logs the signal level and positioning information during the measurement event.

This document provides a technical description of the Path Loss Data Normalization (PLDN) function for Growth Management. PLDN is used to add or remove the effects of an antenna on measured or modeled path loss data.

An antenna focuses RF energy over a geographical area. When the characteristics of an antenna are known (i.e. the directional gain properties), the influence of the antenna gain can be added or subtracted from a set of path loss data. Removing the antenna gain from path loss data effectively simulates the path loss as if it where a point source.

This document also provides a reference for nomenclature and attribute conventions.

Several names for describing the components of a cellular system are used herein. Each name refers to a set of attributes that describe some physical characteristic. The basic names include:

Location—the set of attributes describing a cell site's position on the earth.

RFMount—the set of attributes describing the position of an antenna at some point above the surface of the earth.

RFPath—the set of attributes describing the directional mounting of an antenna at an RFMount. More specifically, the physical information needed to determine how the cell site antenna focuses energy over a geographical area.

These basic names, actually reference the set of attributes defining that the item.

| Attributes | Location | RFMount | RFPath |
|---|---|---|---|
| Longitude | X | X | X |
| Latitude | X | X | X |
| Elevation | X | X | X |
| Radiation Center | | X | X |
| Orientation | | | X |
| Electrical Tilt | | | X |
| Mechanical Tilt | | | X |
| Antenna | | | X |

Basic Attributes

Longitude—Earth coordinate position in centiseconds. Positive for the Eastern hemisphere.

Latitude—Earth coordinate position in centiseconds. Positive for the Northern hemisphere.

Elevation—Height from mean sea level to ground level in meters.

Radiation Center—Height from the ground to the center of an antenna in meters. Sometimes abbreviated as radctr.

Orientation—Physical direction of antenna in the horizontal plane of the earth. Units are degrees with respect to true north.

Orientation increases clockwise from north.

Mechanical Tilt—Physical direction of antenna in the vertical plane of the earth. Units are degrees with respect to the horizon. Tilt increases positive below the horizon and negative above the horizon. Sometimes abbreviated as mtilt.

Electrical Tilt—Shift in the main lobe of the antenna pattern in the vertical plane of the earth. Units are in degrees and follow the same representation as mechanical tilt. Sometimes abbreviated as etilt.

Note that electrical tilt is not a physical characteristic. It can be treated as a property of the RFPath since it is modeled the same as mechanical tilt. Most antenna models are available with different electrical tilts.

Electrical tilt can also be defined as an attribute for the antenna. When the vertical antenna pattern includes the effects of electrical tilt, it should be defined as an attribute of the antenna and the effects are incorporated in the antenna pattern. If the pattern does not include electrical tilt, it is defined for the RFPath and the effect of electrical tilt is modeled the same as mechanical tilt.

Antenna—This is a reference to a set of attributes describing the characteristics of an antenna.

Antennas:

This section identifies the set of attributes that describe an antenna. Of primary interest are the attributes describing the electrical properties. These electrical properties identify the antenna's ability to focus RF energy in 3 dimensions. This information is provided by defining the maximum gain and the gain of the antenna in the horizontal and vertical planes via an antenna pattern.

Antenna Pattern—The antenna pattern is represented by an array of gain values in dB [$\leq 0$ dB], each value associated with an angle in degrees [0° . . . 359°]. The antenna pattern value represents the difference in gain from the max gain point of the antenna. Therefore at the max gain point of the antenna, the value is zero for the horizontal and vertical antenna patterns. These gain values must be negative numbers or zero.

Figure 11:
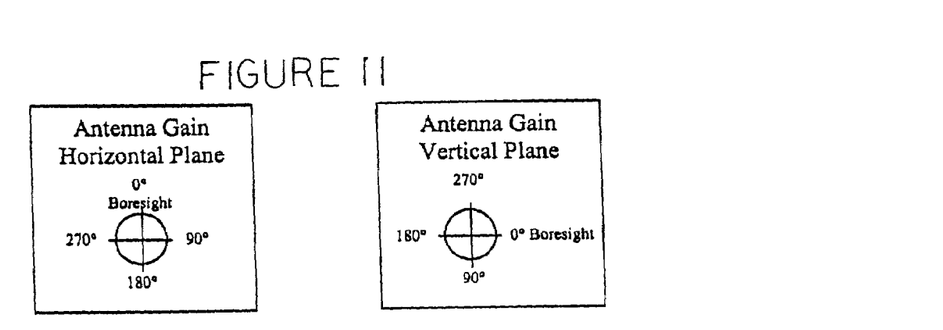
FIG. 11 illustrates the standard for identifying antenna direction angle.

The antenna boresight refers to the physical direction (aim) of the antenna. The antenna boresight corresponds to the position 0,0 in the horizontal and vertical planes. Note that the boresight is not necessarily the point of maximum gain on the antenna pattern. The angle increases clockwise from the boresight, as illustrated in FIG. 11. To determine the antenna gain at a specific point, it is necessary to know the max gain and the angles from bore sight in the horizontal and vertical planes.

$$G_{ant}[\theta,\sigma] = G_{ant,max} + G_{ant,hor}[\theta] + G_{ant,ver}[\sigma]$$

Where:

$G_{ant}$=antenna gain in dB $G_{ant,max}$=max gain of antenna with respect to an isotropic sphere θ=angle in horizontal plane with respect to bore sight σ=angle in vertical plane with respect to bore sight
$G_{ant,hor}$=array of gain offsets on horizontal plane
$G_{ant,ver}$=array of gain offsets in vertical plane The horizontal and vertical antenna patterns are represented by an array of 360 decimal values. Each value is the gain offset in dB. The first value of the array is the boresight (0°) value, increasing 1 degree for each value in the array, up to the value at 359 degrees.

Some manufacturers supply antenna patterns with various degrees of electrical tilt, while others only supply the pattern with zero electrical tilt. If the antenna pattern includes electrical tilt, the electrical tilt is specified as an attribute of the antenna. If the manufacturer only supplies the pattern with zero electrical tilt, the RFPath attribute can be used to model this factor.

A scanning receiver tuned to a particular frequency, cannot distinguish between separate signals on that same frequency and therefore does not have the ability to determine if a signal originates from one or more than one cell antenna in an AMPS/FDMA system. Because of the overlap of signals when all of the cell sites are active, the test vehicles cannot accurately determine a signal level from a given antenna location. A received signal level may be the combination of signals from more than one base station. In order to avoid this problem when drive testing an AMPS system, individual antennas on each sector are keyed-up to a constantly transmitting state on a single particular frequency distinct from all of the other sectors. This is commonly referred to as a keyed-up or beacon signal. By tuning to a particular frequency, a receiver in a test vehicle can accurately determine the base station corresponding to the received signal and can determine the signal level from that single sector.

In key up testing, a unique test channel is established on each sector that propagates into a measurement area. By establishing a unique test channel on a sector, measurements for the given channel can be positively associated to the source sector. This methodology for establishing the unique test channel requires modifications to the system. The test channel is placed in a mode such that it transmits a constant signal, which is referred to as a "key-up". In addition, the same channel (and sometimes adjacent channels) is turned off ("blocked") on all other sectors that propagate into the measurement area. The process of keying-up and blocking channels requires that many channels be removed from service to perform this measurement collection. Therefore, the measurement collection is limited to periods when there are few mobiles operating in the system, typically 10 pm to 5 am.

If the number of sectors that propagate into a measurement area is greater than the number of key-up channels available, a series of overlapping drives are performed. In this situation, a subset of sectors are assigned key-up channels while the measurements are performed in an area. The area is then re-driven with a different subset of sectors assigned key-up channels. This process is repeated until measurements have been obtained for each sector that propagates into the measurement area.

The goal of collecting measured data is to obtain a complete set of measurements at each location. Complete means that a measurement was achieved for each sector, or it was determined that the sector is below a signal level that can be detected by the scanning receiver.

The current method for collecting measured data on a cellular system uses a technique referred to as "key-up" testing. In this methodology, unique test channel is enabled on each sector that propagates into a measurement area. By establishing a unique test channel on a sector, measurement for the given channel can be positively associated to the source sector. The process for establishing the unique test channel requires modifications to the wireless system. The test channel is placed in a mode such that it transmits a constant signal, which is referred to as a "key-up" signal. In addition, the same channel (and sometimes adjacent channels) is turned off ("blocked") on all other sectors that propagate into the measurement area.

The process of key-up and blocking channels requires that many channels be removed from service to perform this measurement collection. Therefore, the measurement collection is limited to periods when there are few mobile units operating in the system, typically between 10 PM and 5 AM. In addition, the use of this methodology is impractical on some systems due to limitations in the number of available channels and/or the availability to configure the system.

It is therefore an object of the invention to provide a methodology for collecting measured path lost data that does not rely on a cumbersome system configurations. This would alleviate the numerous logistical problems and coordination card by the cellular operator.

The proposed methodology of the present invention, utilizes specialized measurement equipment. The measurement equipment is capable of performing RSSI measurements and decoding a "color-coded" transmitted on a digital channel. The color-coded is a digital signature incorporated in information transmitted by the channel.

By association the channel/color code combination detected by the receiver to the combinations known to exist on a sector, the measured signal level can be associated to a particular sector. This assumes that the combination of channel/color code provides a unique identifier. There are situations where this information alone cannot provide a unique identifier, therefore resulting in ambiguity between the sectors using that combination of channel/color code.

The ability to decode the color code on a channel is affected by low signal levels and interference. In areas affected by interference, it is difficult to obtain RSSI measurements and color code information for signals arriving from multiple sectors on the same frequency. Using advanced signal processing techniques, as top in the present invention, it is possible to decompose the signal to provide RSSI and color codes for the contributing sectors.

In TDMA systems IS-54 and IS-136, GSM and iDEN, the signal contains a digital information component identifying the transmitting antenna of a particular signal on a common frequency. It is not necessary to key-up base stations in order to distinguish cell site locations. A drive test can be performed during normal operation of the wireless system. The receiving equipment in the drive test vehicles can determine the transmitting sector based on the Digital Verification Color Code, DVCC, assigned to each sector. The wireless signal for data collection can be acquired by using test equipment designed for TDMA systems, such as the E747A TDMA Drive-Test System from Agilent Technologies and the SeeGull Scanning Receiver from Dynamic Telecommunications. The scanning receivers must be combined with control and positioning equipment as well as data collection and management elements.

The scanning receiver is capable of performing measurements and decoding a "color code" transmitted on a digital channel. The color code is a digital signature incorporated in information transmitted by the channel. By associating the channel and color code combination detected by the receiver to the combinations known to exist on a sector, the measured signal level can be associated to a particular sector. This assumes that each combination of channel and color code provides a unique identifier, which can be made possible with few modifications to the system.

The ability to decode the color code on a channel is affected by low signal levels and interference. The probability of decoding the color code diminishes due to these factors. Therefore the measurement system may not be capable of decoding a color code at some locations. The resulting data is incomplete due to gaps in the measurements for affected sectors.

In some systems, it is possible to increase the probability of obtaining a color code by attempting rapid decodes on every channel used on a sector. In particular, when the decode is affected by interference, it may be possible to obtain a decode on a channel not receiving interference. There are three likely situations when this could occur:

First, if the interfering signal transitions into momentary fade this may allow an opportunity for reduction of the interference and to decode the signal on the monitored channel.

Second, the combination of channels used in the monitored sector may be different than the channels used on the interfering sector, providing at least one channel not common to the monitored sector and the interfering sector and thus a channel that is not receiving interference.

Third, when channels become inactive when not carrying traffic, it is possible to obtain a non-interference opportunity on at least one channel of a the monitored sector.

These techniques can significantly reduce, but not eliminate, the gaps in the measurement data.

Even with TDMA, DVCC information obtained by drive testing can be incomplete and/or inaccurate. For example, if all of the sectors and channels of a particular site are assigned, the receiving equipment could measure raw RF power, however, it may not be possible for the test equipment to identify a signal at a given location. Momentary systems anomalies can also create drop spots or holes in reception during drive testing, thereby interfering with the collection of signal level measurements on a cellular system utilizing a measurement system. Certain physical conditions, such a bridges and/or tunnels, can create reception anomalies and or increased interference, thereby effecting the normalization of data. Also, the reliability factor of signal measurement, taught herein as an error rate, can cause assignment of varying analysis weight to certain collected data.

Besides actual measurement values, there is information that can be used to provide a more accurate interpolation. The interpolation algorithms can utilize modeled propagation values as secondary information to bolster the estimation. Also, in cases where it may not be possible to associate a measurement to a particular sector (due to inability to decode a color code), the measurement information can still be used to determine an upper bound of the signal level that would be present at a location.

For example, control channels (and key-up channels) transmit a continuous signal. When a measurement is obtained on these channels, it is assured that the signal level received by any sector using that channel in such a mode is below the value measured. This upper bound information can be incorporated in providing a more accurate estimate.

These and other features of the invention will be better understood by reference to the detailed description which follows taken together with the drawings in which like elements are referred to by like designations throughout the several views.

DETAILED DESCRIPTION OF EXEMPLARY EMBODIMENTS

Figure 3:
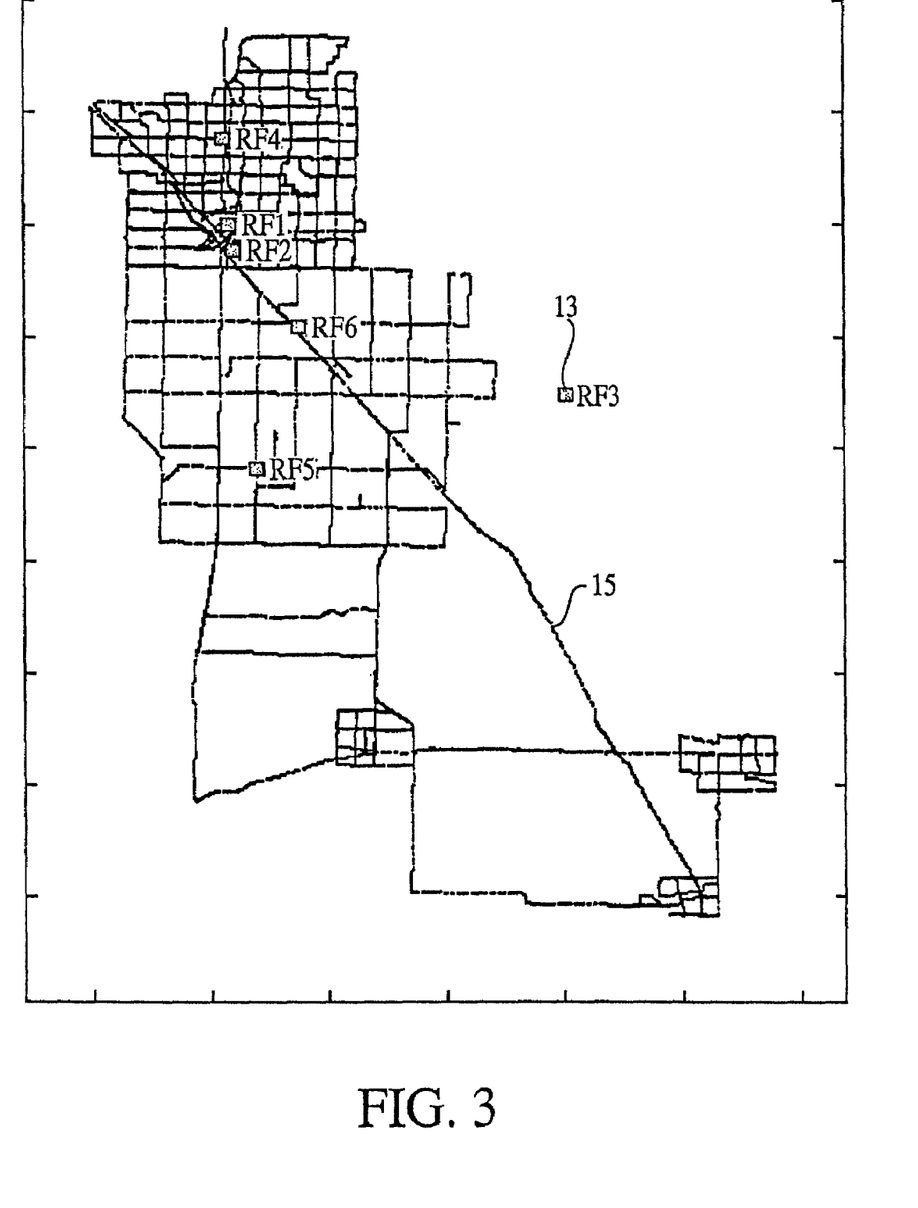
FIG. 3 is an exemplary map of an area illustrating the location of six cell sites and an exemplary drive map plan for evaluation of the sites.

FIGS. 1 and 3 illustrate exemplary street maps of portions of exemplary cellular systems. The maps of FIGS. 1 and 3 also illustrates the locations of a plurality of exemplary cell sites with base stations 13. The site may be divided into three or more segments by use of directional antennae. The sites could be divided into any number of segments including a single segment per cell, three segments are illustrated in FIG. 1 only for the sake of example. The system may have additional not illustrated cells 13 which overlap to provide effective coverage in the region of the cellular system illustrated in FIGS. 1 and/or 3.

FIG. 2 illustrates an exemplary drive test route plan 15 overlayed on the cellular system illustrated in FIG. 1. FIG. 3 illustrates a drive test plan for the system of cell sites RF1 through RF6. The drive plan 15 is a carefully determined route which will provide maximum efficient coverage of the cellular system. The drive plan 15 is established by evaluation of the distribution of the antennae 13 of the cellular system and through analysis of the geographical features of the area of the cellular system. The drive test planning criteria are more fully described in co-pending applications of the common assignee.

As detailed in copending applications, a vehicle equipped with appropriate cellular signal receiving and measuring equipment is driven through the cellular system in accordance with the drive test plan map to collect actual signal reception data. A statistically significant number of measurements are taken throughout the cellular system to determine the relative signal strength between each base station and each mobile unit location. The path loss of the signal is measured in dB. As the strength of the received signal decreases, it has a greater path loss or signal loss which is recorded as greater positive dB number.

Figure 4:
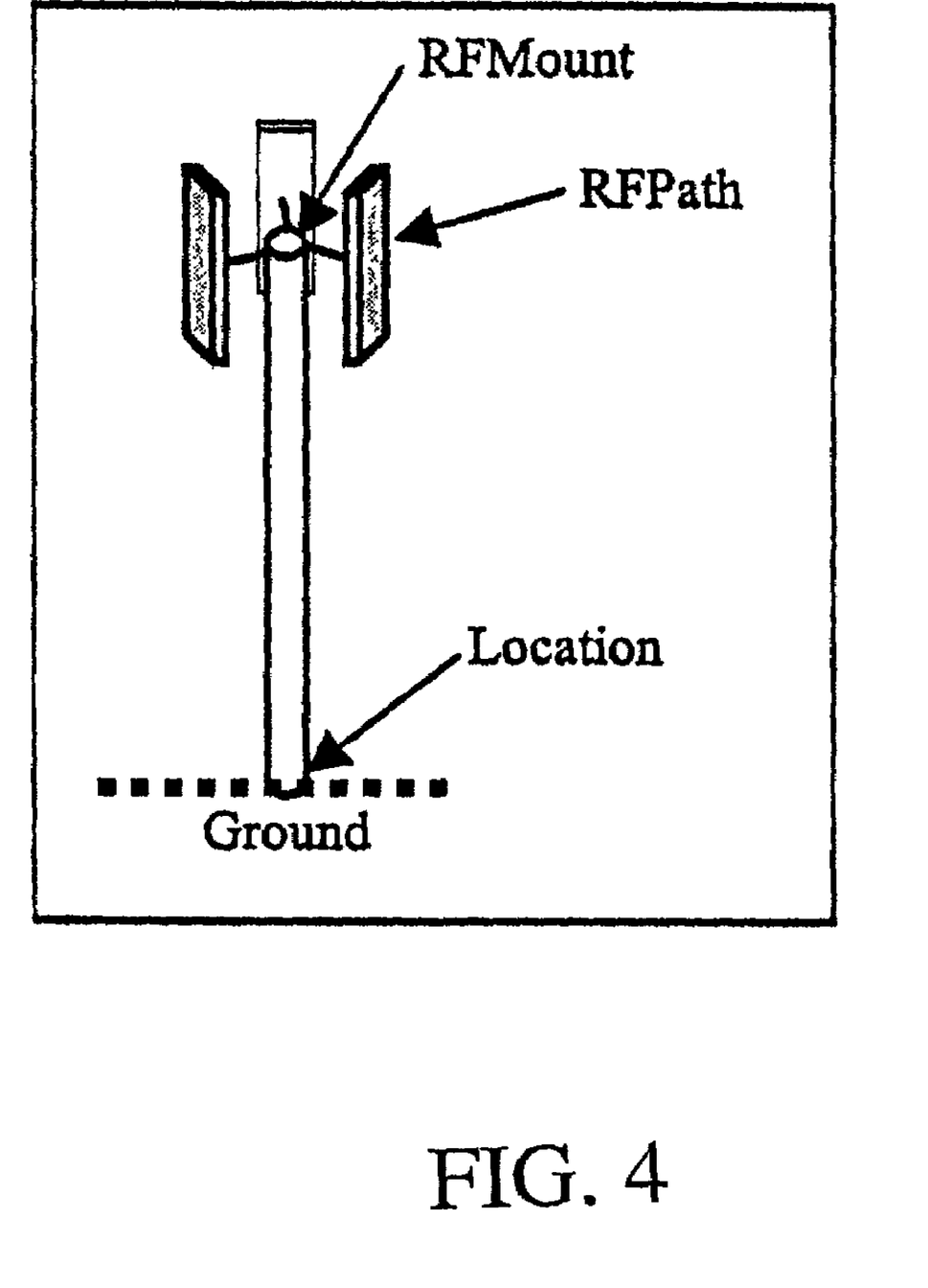
FIG. 4 is a perspective view of a simplified antenna tower with three sectors and a single antenna per sector.
Figure 5:
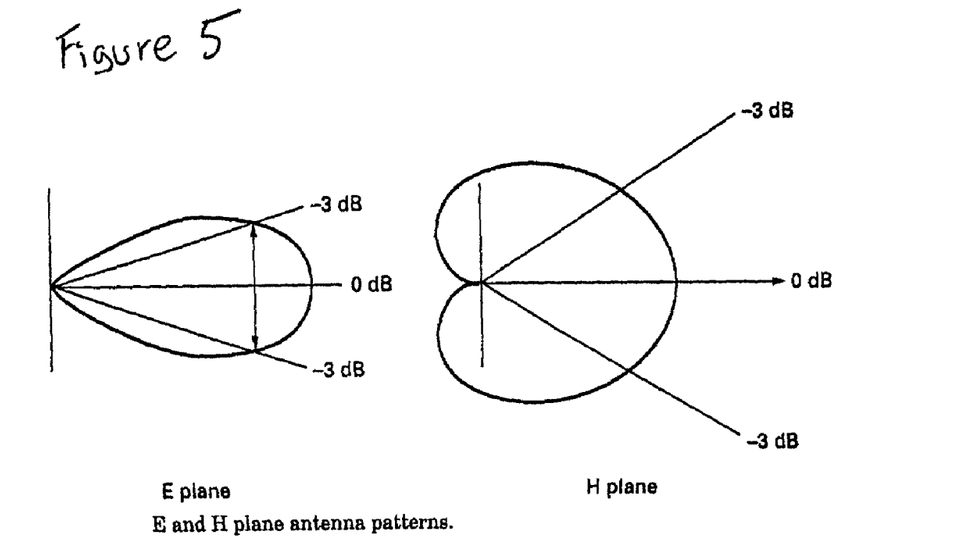
FIG. 5 is a typical antenna design pattern for a directional antenna.
Figure 6:
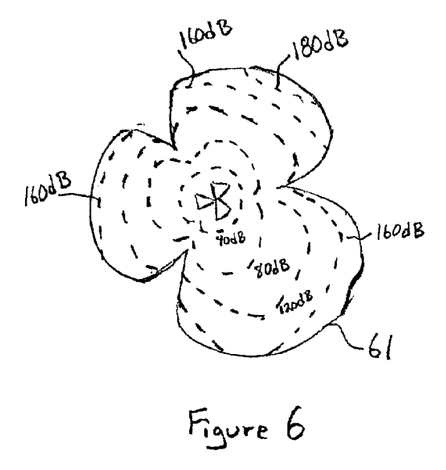
FIG. 6 illustrates measured path loss data contours for the cell site of FIG. 4.

The cellular tower illustrated in FIG. 4 has been simplified for explanation herein. A typical cellular tower can contain a large number of antenna each of which having its own antenna pattern and positioned to provide directional coverage. In FIG. 4, the tower 40 has been illustrated with only three antenna 41, 42 and 43. As illustrated in FIG. 6, each of the antenna 41, 42 and 43 correspond to sectors A, B and C. A typical RF broadcast pattern for a typical directional cellular antenna is illustrated in FIG. 5.

During a drive test, a receiver 61 is transported through the cellular system and measured RSSI values are recorded for locations throughout the system. The wireless signal is also decoded to determine the origin of each signal corresponding to an RSSI value in order to identify the antenna of origin for a particular signal. The collection system then matches the measured path loss data of signals with the antenna of origination. FIG. 6 illustrates a typical pattern of received signal strength values. The outer boundary 61 indicates reception that farthest distance from the tower of a signal of sufficient strength to determine the origination antenna from resolution of color code. Typically, a signal cannot be identified if the path loss is greater than approximately 150 to 170 dB.

Utilizing the typical antenna pattern for each of the antenna 41, 42 and 43 the expected coverage pattern for the antennae on cellular tower 40 is illustrated in FIG. 6. Inside the boundary 61, a signal has been detected and decodes to identify the signal with the cell site. Outside the boundary 61, the collection system is unable to decode any signals to identify the antenna of origin. A large number of measurements for an individual cell site are used to determine the path loss from the cell site to locations within the cellular system. The directionality of the antenna design and the orientation of the location l with respect to the each of the antennae will effect the propagation of a signal and its path loss at a location l. Path loss contours, in dB, are illustrated in FIG. 6 to provide an example of what a typical propagation contour within a measured boundary.

Figure 7:
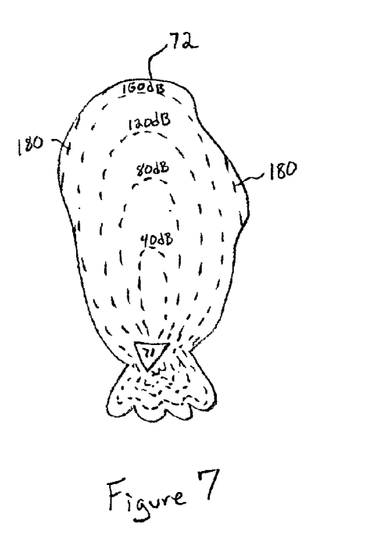
FIG. 7 illustrates measured path loss data contours for a single antenna.

FIG. 7 illustrates a set of exemplary measurements for a single antenna of a cell site. The antenna 71 is a typical directional antenna with a main front lobe and side and back lobes as illustrated in FIG. 5. The boundary 72 illustrates the extent of measurements obtained and decoded to identify antenna 71 as the originating antenna. The boundary will not typically match the antenna design pattern because the extent of measurements will be effected by system implementation factors such as geography of the wireless system, buildings and the measurement methods. The exemplary illustrative path loss measurements in units of dB of loss are illustrated as contours for the antenna 71.

Figure 8:
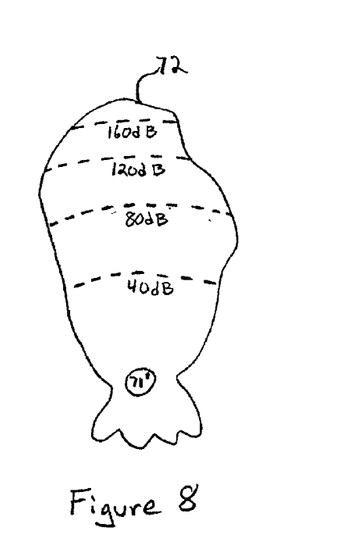
FIG. 8 illustrates propagated path loss data for the measured antenna path loss data of FIG. 7 with the directionality of the antenna design removed.

When the measurement data for the antenna 71 is normalized to remove the effects of the directionality of the antenna design, the path loss contours for the antenna are redrawn os illustrated in FIG. 8. The path loss contours of FIG. 8 are derived from the measured antenna data from FIG. 7 by removing the directional gain from the antenna 71 and plotting the propagation from antenna 71' as if it were an omnidirectional point source antenna with measurements only within the boundary 72. When all of the antennae of a site are normalized to eliminate directionality, and used to adjust the path loss value measured at each location l to correct for antenna design directionality. Once the directionality of the antenna design is factored out, a value indicative of the path loss due to the distance and direction from the tower as a point source is obtained. The confidence of each of the obtained values, based upon a number of factors, including C/I ratio and if the signal was obtained from a main lobe of the antenna, a side lobe, a back lobe or as a result of signal scatter, can be factored into the calculation for the elimination of directionality. Each of the values for locations where a signal from the tower was received can be weighted based upon confidence and the values are combined to derive a representative RF propagation pattern for the tower as a point source, taking all antenna from all sectors of the tower into account and removing directionality caused by the individual antenna designs. An RF propagation pattern with path loss in dB, for the tower as a whole may take the form of one of the exemplary patterns illustrated in FIG. 9 or may present any of a number of forms.

Figure 9:
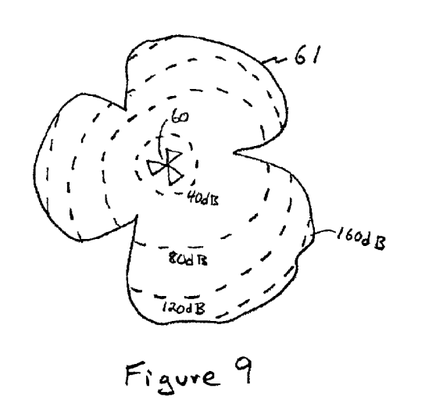
FIG. 9 illustrates propagated path loss data for the measured antenna path loss data of FIG. 6 with the directionality of the antennae designs removed.

The pattern of FIG. 9 will not be actual RF signals from the respective towers but instead represent the path loss attributable to physical factors other than antenna orientation and directionality. The projected RF propagation based upon modeling an omnidirectional point source antenna based upon the influences of the cell site location as derived from the measured data may yield a more circular distribution than the measured data from the directional antennae. However the circular propagation of the non-directional antenna will be distorted by physical characteristics of the cell site, as illustrated in the exemplary embodiment. The actual RF pattern, illustrated in FIG. 6, will depend on the particular antennae selected, the orientation characteristics of the selected antennae, the mounting of the antennae and the path loss attributable to the physical factors surrounding the cell site.

By eliminating directionality induced by antenna design, the present invention provides a powerful design tool to allow for redesign, redirection and orientation decisions based upon the geographic aspects of cell tower location. The designer who is designing, planning and/or reconfiguring a system can determine the resultant actual RF propagation of a selected antenna design by implementing the present invention to determine the base RF path loss and the project the RF signal propagation pattern by implementing the present invention to factor in the directionality and orientation of the antennae of the selected design.

Antenna Attributes

This section identifies the set of attributes and characteristics stored for each antenna. Several of these attributes are derived from the antenna patterns.

Manufacturer Name—Name of company that manufactured antenna.

Model Name—Antenna model name provided by manufacturer.

Date—The date when information was updated.

Min Frequency—Minimum frequency of antenna in MHz as specified by manufacturer.

Max Frequency—Maximum frequency of antenna in MHz as specified by manufacturer.

Front to Back Ratio—Difference in gain between boresight and the point directly opposite boresight. In particular:

$$\text{Front2Back\_Ratio} = (G_{ant,hor}[0°] + G_{ant,ver}[0°]) - (G_{ant,hor}[180°] + G_{ant,ver}[180°])$$

Max Gain—Maximum gain of antenna with respect to an isotropic sphere in dB.

Horizontal Beam Width—Angle in degrees between the half power points (3 dB) on the horizontal pattern.

Vertical Beam Width—Angle in degrees between the half power points (3 dB) on the vertical pattern.

Electrical Tilt—Angle in degrees of electrical tilt included in the vertical antenna pattern.

Horizontal Gain Pattern—Array of values in dB representing the offset in gain from the Max Gain on the horizontal plane. See section on Antenna Patterns.

Vertical Gain Pattern—Array of values in dB representing the offset in gain from the Max Gain on the vertical plane. See section on Antenna Patterns.

Antenna Models

The antenna database includes antenna information for most major manufacturers of Cellular and PCS antennas. These manufacturers include: Andrew, Cablewave, Celwave, CushCraft, Decibel, Gabriel, RSIMark, Shively, Sinclair.

The antenna database provides this information in a consistent format. Parsers and loaders are required to keep this information updated as new models become available.

Description of Antenna Normalization

Path Loss Data Normalization provides the ability to add or remove the effects of an antenna from a set of path loss data. This process involves offsetting the path loss value for each path loss data point with the antenna gain relative to each path loss data point location. In addition, the variance associated with each path loss data point may be adjusted by the variance associated with the corresponding point on the antenna pattern. This requires the RFPath and path loss data point information.

The following information is provided for each path loss data point;

Latitude

Longitude

Path Loss

Variance

It is assumed that there is a conversion from the Latitude and Longitude values of the RFPath and the path loss data point to planar geometry, where;

$X_s, Y_s$=planar location of RFPath $X_p, Y_p$=planar location path loss data point In addition, the elevation for the respective locations is obtained from the terrain database. Note that the elevation provided with the RFPath should not be used, since there may be a significant offset between the elevation value provided and the value in the terrain database.

$Z_s$: elevation of RFPath $Z_p$: elevation path loss data point

Determining Antenna Gain

Using the antenna identified in the RFPath, the antenna information is obtained from the antenna database.

Figure 12:
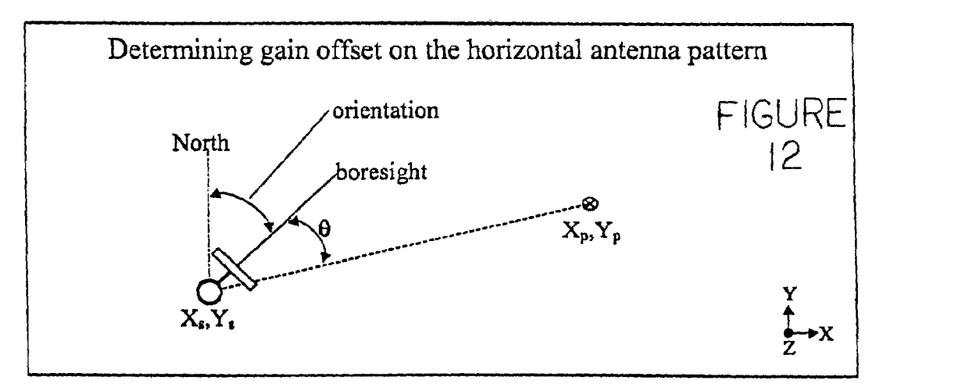
FIG. 12 illustrates the standard for identifying horizontal gain offset.

To determine the gain offset from the horizontal antenna pattern relative to the path loss data point's location, calculate the angle θ. This requires calculating the angle from true North to the path loss data point location, and incorporating the RFPath orientation. This is depicted in FIG. 12.

Figure 13:
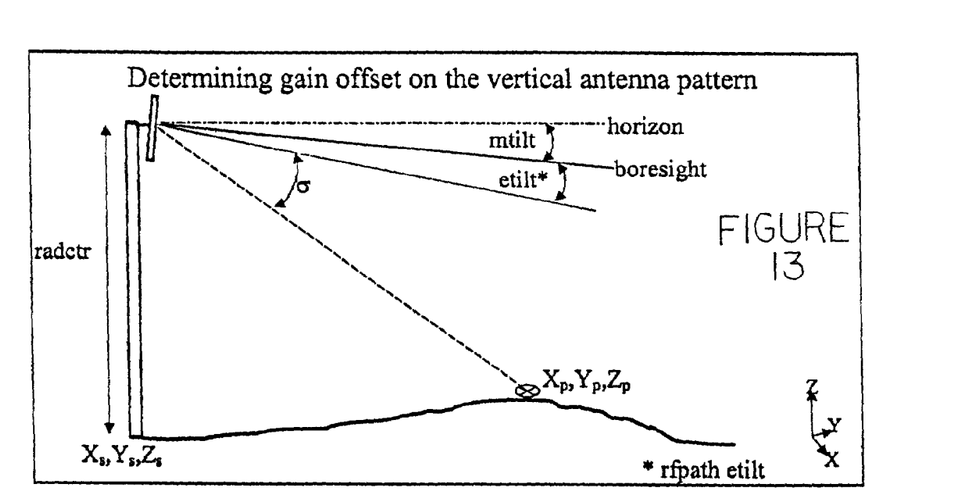
FIG. 13 illustrates the standard for identifying vertical gain offset.

To determine the gain offset from the vertical antenna pattern relative to the path loss data point's location, calculate the angle σ. This requires calculating the angle from the RFPath horizon to the path loss data, and incorporating the RFPath mechanical tilt and electrical tilt. This is depicted in FIG. 13.

Once angles θ and σ are calculated, the antenna gain can be obtained;

$$G_{ant}[\theta,\sigma]=G_{ant,max}+G_{ant,hor}[\theta]+G_{ant,ver}[\sigma]$$

Adding Antenna Pattern

When adding an antenna pattern, subtract the antenna gain from the path loss data point;

$$PL_{new}=PL_{original}-G_{ant}$$

Removing Antenna Pattern

When removing an antenna pattern, add the antenna gain to the path loss data point;

$$PL_{new}=PL_{original}+G_{ant}$$

Modifying Variance

Figure 10:
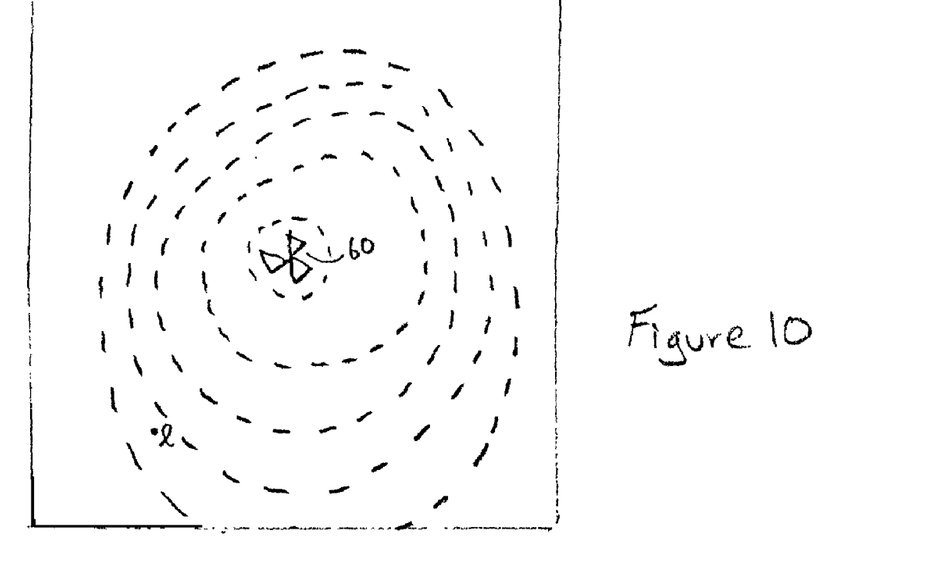
FIG. 10 illustrates the extension of the propagated path loss data of FIG. 9 outside the measurement boundary.

The propagation model illustrated in FIG. 9 is based upon measured data and includes contours of locations within the measurement boundary 61. The propagation model can be expanded to obtain a contour for a region of interest 63 around the cell site 60, such as that illustrated in FIG. 10. With the measured data boundary 61 removed, the contour lines become continuous, however, only some of the points on the contours lines represent measured data while some of the points represent propagation model generated data based on the measured data. When estimating the RSSI or path loss value of a particular location l, (if l is not a measured location) the estimated value of l is based upon a weighted average of neighbor values. When assigning weight to the neighbor values, those values which represent actual measurements can be more heavily weighted than those values representing propagation model generated values.

Although the present invention has been described in terms of preferred embodiments, it will be appreciated that various modifications and alterations, might be made by those skilled in the art without departing from the spirit and scope of the invention. The above-described exemplary embodiments are therefore intended to be illustrative in all respects, rather than restrictive, of the present invention. Thus the present invention is capable of many variations in detailed implementation that can be derived from the description contained herein. All such variations and modifications are considered to be within the scope and spirit of the present invention as defined by the following claims.

What is claimed is:

1. A method for determining an RF propagation pattern for a sector comprising:
   collecting signal data throughout the sector, the signal data defining a plurality of signals having a respective signal strength value at a collection location;
   identifying an originating antenna for each of the plurality of signals received at the collection location;
   determining a path loss value for each signal; and
   normalizing the path loss value to obtain the normalized path loss value for each signal by combining the signal strength values of signals received from one or more antenna directed toward the collection location with signal strength values of signals received from one or more antenna not directed toward the collection location to determine an RF propagation pattern for the sector.

2. The method of claim 1, wherein identifying the originating antenna further comprises decoding each received signal to identify the originating antenna.

3. The method of claim 2, wherein at least one of the plurality of signals is a beacon signal.

4. The method of claim 2, wherein decoding each received signal further comprises associating a channel/color code detected from the signal with a known combination of a particular antenna.

5. The method of claim 1, wherein identifying the originating antenna further comprises keying-up a test channel for propagating a signal into the collection location.

6. The method of claim 1, wherein collecting signal data throughout the sector further comprises conducting mobile data collection through a sector.

7. The method of claim 1, wherein normalizing path loss value removes the effects of the directionality of the originating antenna.

8. The method of claim 1, wherein normalized path loss is a function of distance of the collection location from the originating antenna and antenna characteristic.

9. The method of claim 8, wherein the antenna characteristic is defined by at least one of directional gain of antenna, location of antenna, RF mount, RF path, boresight, mechanical tilt and the electrical tilt of the antenna.

10. The method of claim 1, wherein collecting signal data further comprises using a scanning receiver tuned to a first frequency.

11. The method of claim 1, wherein the antenna not directed toward the collection location includes antenna facing away from the collection location.

12. The method of claim 1, wherein the signal received from the antenna not directed toward the collection location further comprises signals received at the collection location as backscatter or side scatter.

13. The method of claim 1, wherein each of the plurality of signals is normalized independently.

14. A method for determining signal strength at a location within a sector of a wireless communication system comprising:
measuring signal strength of a plurality of incoming signals having a common frequency at a location, the signal strength including contributions from backscatter and antennas facing away from the location;
identifying an originating antenna associated with each of the incoming signals;
determining a path loss value for each of the originating antennas; and
normalizing the path loss value for each of the originating antennas as a function of a characteristic of the originating antenna by determining a combined signal strength as a function of the measured signal strength from each of the plurality of incoming signals and the normalized path loss value for each respective signal.

15. The method of claim 14, wherein measuring signal strength further comprises decoding each received signal to identify the originating antenna.

16. The method of claim 15, wherein decoding each received signal further comprises associating a channel/color code detected from the signal with a known combination of a particular antenna.

17. The method of claim 14, wherein the incoming signal is a beacon signal.

18. The method of claim 14, wherein identifying the originating antenna further comprises keying-up a test channel for propagating a signal into the collection location.

19. The method of claim 14, further comprising determining signal strength at a plurality of locations throughout a sector to define a propagation model of the sector.

20. The method of claim 14, wherein measuring signal strength further comprises using a mobile receiver traveling through a known path within the sector.

21. The method of claim 14, wherein the antenna characteristic is defined by at least one of directional gain of antenna, location of antenna, RF mount, RF path, boresight, mechanical tilt and the electrical tilt of the antenna.

22. The method of claim 14, wherein the path loss is determined as a function of antenna design, directionality and orientation.

23. The method of claim 14, wherein measuring signal strength further comprises establishing a collection route through the sector for collecting signal strength data.

24. The method of claim 14, wherein measuring signal strength further comprises using a scanning receiver tuned to a first frequency.

25. The method of claim 14, wherein the signal strength of a signal includes signal propagation from antenna sidescatter.

26. The method of claim 14, wherein each signal from each antenna is normalized independently.

27. A method for determining signal strength contour for a cell site within a cellular communication network, the method comprising:
receiving a plurality of signals at a plurality of locations within the communication network;
for each received signal, identifying a signal strength value as a function of the propagation direction of a respective originating antenna in a sector, the originating antenna including an antenna facing away from said sector and an antenna located in an adjacent sector;
determining an absolute value of the signal strength; and
defining a signal strength contour for the cell site as a function of the absolute value of the signal strength and the plurality of locations within the communication network.

28. The method of claim 27, wherein the antenna facing away from said sector propagates backscatter and sidescatter signals.

29. A system for determining an RF propagation pattern of a sector comprising:
an RF scanner;
a processor coupled to said RF scanner, said processor programmed with instructions to:
direct the RF scanner to receive signal data throughout the sector, the signal data defining a signal strength at a collection location;
identify an originating antenna for the received signal at each collection location;
determine a path loss value for each received signal;
normalize the path loss value to obtain the normalized path loss value for each received signal;
combine signals received from one or more antennas directed toward the collection location with signals received one or more antennas directed away from the collection location to determine an RF propagation pattern for the sector.

30. The system of claim 29, wherein identifying the originating antenna further comprises decoding the received signal to identify the originating antenna.

31. The system of claim 30, wherein the received signal is a beacon signal.

32. The system of claim 30, wherein decoding each received signal further comprises associating a channel/color code detected from the received signal with a known combination of a particular antenna.

33. The system of claim 29, wherein identifying the originating antenna further comprises keying-up a test channel for propagating a signal into the collection location.

34. The system of claim 29, wherein collecting signal data throughout the sector further comprises conducting mobile data collection.

35. The system of claim 29, wherein normalized path loss is a function of distance of the collection location from the originating antenna and antenna characteristics.

36. The system of claim 29, wherein normalized path loss is a function of antenna characteristic.

37. The system of claim 36, wherein the antenna characteristic is defined by at least one of directional gain of antenna, location of antenna, RF mount, RF path, boresight, mechanical tilt and the electrical tilt of the antenna.

38. The system of claim 29, wherein collecting signal data further comprises tuning the RF scanner to a first frequency.

39. The system of claim 29, wherein the antenna directed away from the collection location includes an antenna located an adjacent sector and facing away from the collection location.

40. The system of claim 29, wherein the signal received from the antennas directed away from the collection location further comprises signals received at the collection location as backscatter or side scatter.

41. The system of claim 29, wherein each signal from each antenna is normalized independently.

42. An apparatus for determining signal strength at a location within a sector of a wireless communication system comprising:
  an RF scanner;
  a geo-location device, said geo-location device communicating with the RF scanner; and
  a processor operationally connected to said RF scanner, the processor programmed with instructions to:
    direct the RF scanner to measure signal strength of a plurality of incoming signals having a common frequency at a location, the signal strength including contribution from backscatter and antennas facing away from the location;
    identify an originating antenna associated with each of the incoming signals;
    determine a path loss value for the originating antenna;
    normalize the path loss value for each antenna as a function of the originating antenna characteristic; and
    determine signal strength as a function of combined signal strength from each of the plurality of incoming signals and normalized path loss value.

43. The apparatus of claim 42, wherein measuring signal strength further comprises decoding each received signal to identify the originating antenna.

44. The apparatus of claim 43, wherein decoding each received signal further comprises associating a channel/color code detected from the signal with a known combination of a particular antenna.

45. The apparatus of claim 42, wherein the incoming signal is a beacon signal.

46. The apparatus of claim 42, wherein identifying the originating antenna further comprises keying-up a test channel for propagating a signal into the collection location.

47. The apparatus of claim 42, wherein the processor is further programmed to determine signal strength at a plurality of collection locations throughout a sector to define a propagation model of the sector.

48. The apparatus of claim 47, wherein the plurality of collection locations define a test route.

49. The apparatus of claim 42, wherein the antenna characteristic is defined by at least one of directional gain of antenna, location of antenna, RF mount, RF path, boresight, mechanical tilt and the electrical tilt of the antenna.

50. The apparatus of claim 42, wherein the path loss is determined as a function of design, directionality and orientation of the antenna.

51. The apparatus of claim 42, wherein the processor is further programmed with instructions to establish a route through the sector for measuring signal strength.

52. The apparatus of claim 42, wherein the signal strength further comprises contribution from antenna sidescatter.

53. The apparatus of claim 42, wherein each signal from each antenna is normalized independently.

* * * * *